US007621575B1

(12) United States Patent

Kellerman

(10) Patent No.: US 7,621,575 B1

(45) Date of Patent: Nov. 24, 2009

(54) APPARATUS FOR TRANSPORTING A FUNERAL URN

(75) Inventor: Michael R. Kellerman, Cincinnati, OH (US)

(73) Assignee: Eagle Specialty Vehicles, LLC, Amelia, OH (US)

( * ) Notice: Subject to any disclaimer, the term of this patent is extended or adjusted under 35 U.S.C. 154(b) by 646 days.

(21) Appl. No.: 11/527,808

(22) Filed: Sep. 27, 2006

Related U.S. Application Data

(60) Provisional application No. 60/721,866, filed on Sep. 28, 2005.

(51) Int. Cl.
*A61G 21/00* (2006.01)
*B60R 7/04* (2006.01)

(52) U.S. Cl. ......................... 296/16; 224/282; 224/553; 296/18; 296/37.14

(58) Field of Classification Search ................. 224/282, 224/544, 548, 549, 553; 296/16, 17, 18, 296/37.1, 37.5, 37.14; D99/5, 8, 19
See application file for complete search history.

(56) References Cited

U.S. PATENT DOCUMENTS

| | | | | | |
|---|---|---|---|---|---|
| 1,597,569 | A | * | 8/1926 | Barringer | 4/268 |
| 2,174,244 | A | * | 9/1939 | Jacobs | 224/280 |
| 2,254,193 | A | * | 8/1941 | Augustine | 296/63 |
| 2,347,002 | A | * | 4/1944 | Schofield | 296/16 |
| 2,460,712 | A | * | 2/1949 | Peterson | 297/174 R |
| 4,607,417 | A | * | 8/1986 | Hancovsky | 27/1 |
| D304,641 | S | * | 11/1989 | Bourassa | D99/5 |
| 5,441,183 | A | * | 8/1995 | Frenzel | 224/542 |
| D374,962 | S | * | 10/1996 | Allen et al. | D99/5 |
| 5,904,389 | A | * | 5/1999 | Vaishnav et al. | 296/37.1 |
| 6,254,152 | B1 | * | 7/2001 | Tillett | 294/15 |
| 6,623,060 | B2 | * | 9/2003 | Gehring et al. | 296/37.5 |
| 6,729,247 | B2 | * | 5/2004 | Brown et al. | 110/341 |
| 7,249,795 | B1 | * | 7/2007 | Kellerman | 296/37.1 |
| 2002/0000456 | A1 | * | 1/2002 | Zimmermann et al. | 224/498 |
| 2002/0070574 | A1 | * | 6/2002 | Carlsson et al. | 296/37.14 |
| 2002/0185507 | A1 | * | 12/2002 | Seel et al. | 224/498 |
| 2004/0020957 | A1 | * | 2/2004 | Poliquin et al. | 224/543 |
| 2004/0056058 | A1 | * | 3/2004 | Ryan | 224/498 |
| 2009/0178594 | A1 | * | 7/2009 | Fremming | 108/50.11 |

FOREIGN PATENT DOCUMENTS

| | | | | |
|---|---|---|---|---|
| JP | 61157452 | A | * | 7/1986 |

* cited by examiner

*Primary Examiner*—Glenn Dayoan
*Assistant Examiner*—Paul A Chenevert
(74) *Attorney, Agent, or Firm*—Neal O. Willman

(57) ABSTRACT

A funeral urn transport device for storing and facilitating the transport of a funeral urn in a vehicle, typically, a hearse. The transport device includes a compartment that pivots within an opening in the floor of the rear compartment of the hearse for storage below the floor of the hearse when not in use and pivots to rise above the floor of the hearse to securely contain, hold and display a funeral urn, in an dignified manner, for transport to a service or repose.

7 Claims, 2 Drawing Sheets

APPARATUS FOR TRANSPORTING A FUNERAL URN

CROSS-REFERENCE TO RELATED APPLICATION

This application claims the benefit of the filing date of U.S. Provisional Application 60/721,866, filed Sep. 28, 2005.

BACKGROUND OF THE INVENTION

This disclosure essentially relates to a means and apparatus for transporting a funeral urn, typically, an urn containing the cremated remains of a human being, in a ceremonious and dignified manner. The apparatus is intended to be an integral part of the hearse. However, it is specifically designed to be easily accessed when needed and just as easily stored unobtrusively beneath the floor of the hearse when not needed.

DESCRIPTION OF THE PRIOR ART

The patent art appears devoid of relevant references to the disclosed method and apparatus. Of limited relevance is U.S. Pat. No. 4,607,417, which issued to Hancovsky on Aug. 26, 1986. The Hancovsky invention relates generally to the interment of cremated remains and, more particularly, to an urn-like canister construction for holding such remains and a niche plate configuration adapted to lockably receive and store the canister in one of an array of similar cremation niches for use in both indoor and outdoor interment environments. No mention is made of means for storing and transporting funeral urns.

U.S. Pat. No. 6,254,152, which issued to Tillett on Jul. 3, 2001, relates to a device for ceremoniously transporting an urn by at least two urn bearers. The device comprises a flat surface having top and bottom sides. The top side has a lip into which the urn is placed to minimize undesired movement of the urn. The device is further equipped with at least four protruding posts to be gripped by the urn bearers and wherein the posts may be positioned on the bottom side of the flat surface to allow the device to function as a table. There is no mention of vehicular transport.

U.S. Pat. No. 6,729,247, which issued to Brown et al. on May 4, 2004, relates to a method and apparatus for cremating the remains of a deceased being. The method comprises transporting a mobile crematorium to a location wherein the deceased is to be cremated. The mobile crematorium comprises a combustion chamber, wheels and a trailer hitch. After cremation, the noncombustible materials are removed from the chamber and placed in a storage device such as an urn. No mention is made of transporting the urn.

SUMMARY OF THE INVENTION

Essentially disclosed and describe herein is an apparatus for securely holding a funeral urn and its contents for transport in a vehicle, typically a hearse or funeral coach, to any of a variety of destinations, with style and dignity. The apparatus comprises a housing that pivots within an opening in the floor of the vehicle to assume two modes: an open or deployed mode for holding and displaying the urn, typically in a central and rearward orientation on the floor of the hearse; and a closed or stored mode beneath the floor of the hearse where it will not interfere with the normal and typical function and purpose of a hearse, namely, the transport of casketed remains.

More specifically, the apparatus or device disclosed herein, comprises a housing having a viewing port and at least two sides, one of which pivots to close the opening in the floor of the hearse when the device is in the display mode and another of which pivots to close the opening in the floor of the hearse when the device is in the stored mode. The device also has a pivoting means positioned at the juncture of the pivoting sides which permits the housing to rise above the floor of the hearse and to descend beneath the floor of the hearse. Within the housing, the device also has a securing means to securely hold the funeral urn during transport.

DESCRIPTION OF THE PREFERRED EMBODIMENTS

Figure 1:
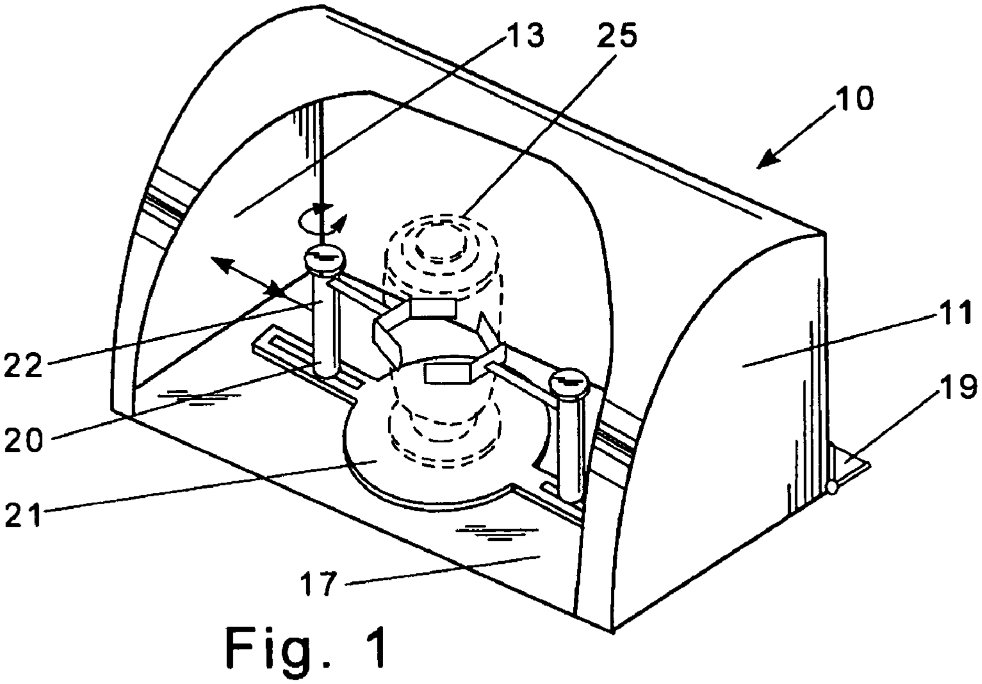
FIG. 1 is a perspective view of the disclosed apparatus or device in the deployed or display mode holding a funeral urn, said urn drawn in phantom.

A comprehensive understanding of the disclosed apparatus is facilitated by referring to the drawing. FIG. 1 is a perspective view of the disclosed apparatus 10 and all of its necessary parts. Essentially the apparatus 10 consists essentially of a housing 11 having a viewing port 13 and at least two sides: a bottom side 17 and a back side 15. The apparatus 10 is typically situated in the rear compartment 12 of a hearse and is preferably positioned in an opening in the floor 14 of the rear compartment 12, within which it can pivot to assume either of two modes: display and storage modes.

When in the display mode, the urn 25 held within the apparatus 10 is literally on display and apparent to all who can see within the rear compartment 12 of the hearse. And, when in the display mode, the bottom side 17 of the apparatus 10 covers the opening in the floor 14 of the hearse.

In order to pivot between the display mode and the storage or concealed mode, a pivoting means 19 is positioned at the juncture of the pivoting back 15 and bottom 17 sides of the apparatus. In the current embodiment of the disclosed apparatus, a heavy-duty piano hinge is the preferred pivoting means 19.

When the apparatus is in the concealed or storage mode, the back side 15 of the apparatus 10 covers the opening in the floor 14 of the hearse, and the rear compartment 12 of the hearse can be used in the conventional manner, which is for the transport of casketed remains.

With continuing reference to FIG. 1, the apparatus 10 includes a means 20 for securing the urn 25 to be positioned within the apparatus 10. Typically, the securing means 20 will have a base or platform 21 upon which the urn is placed and adjustable clamping means 22 for holding the urn 25 on the platform 21 and within the apparatus 10 in a secure, stable and dignified manner. It is preferable, of course, that the clamping means be adjustable to accommodate urns of various shapes and sizes. The clamping means 22 depicted in the drawing provides for both lateral and vertical adjustment.

Figure 2:
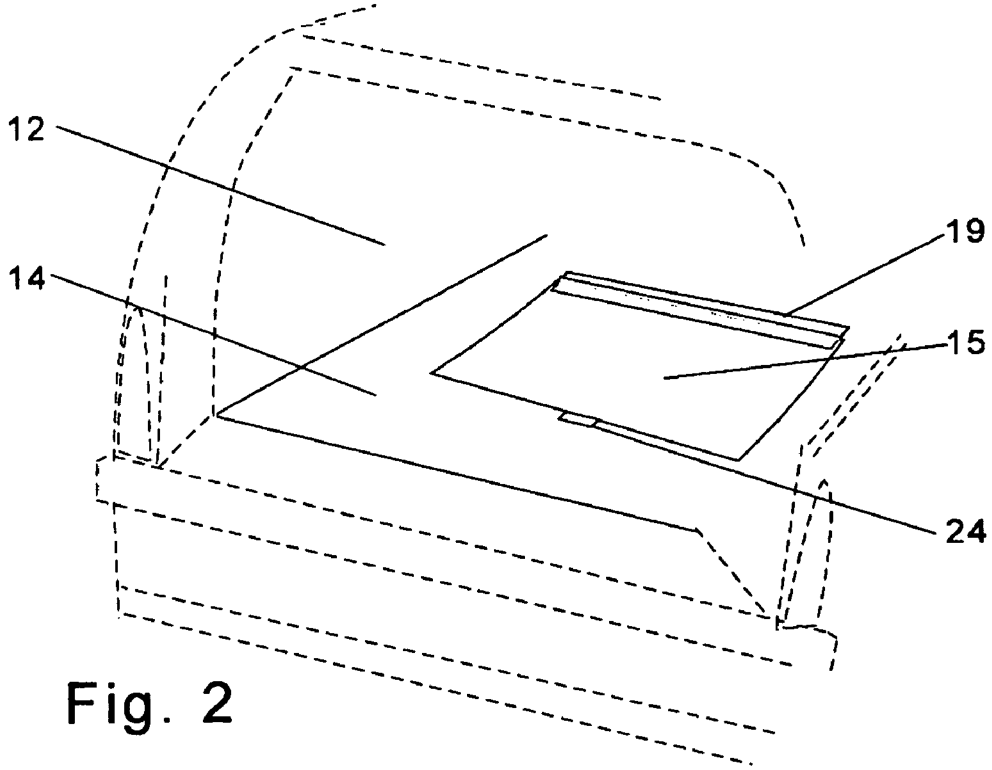
FIG. 2 is a perspective view of the disclosed device in the floor of the rear compartment of a hearse, in the closed or concealed mode, out of sight, neatly stored beneath the floor of the hearse, said hearse drawn in phantom.
Figure 3:
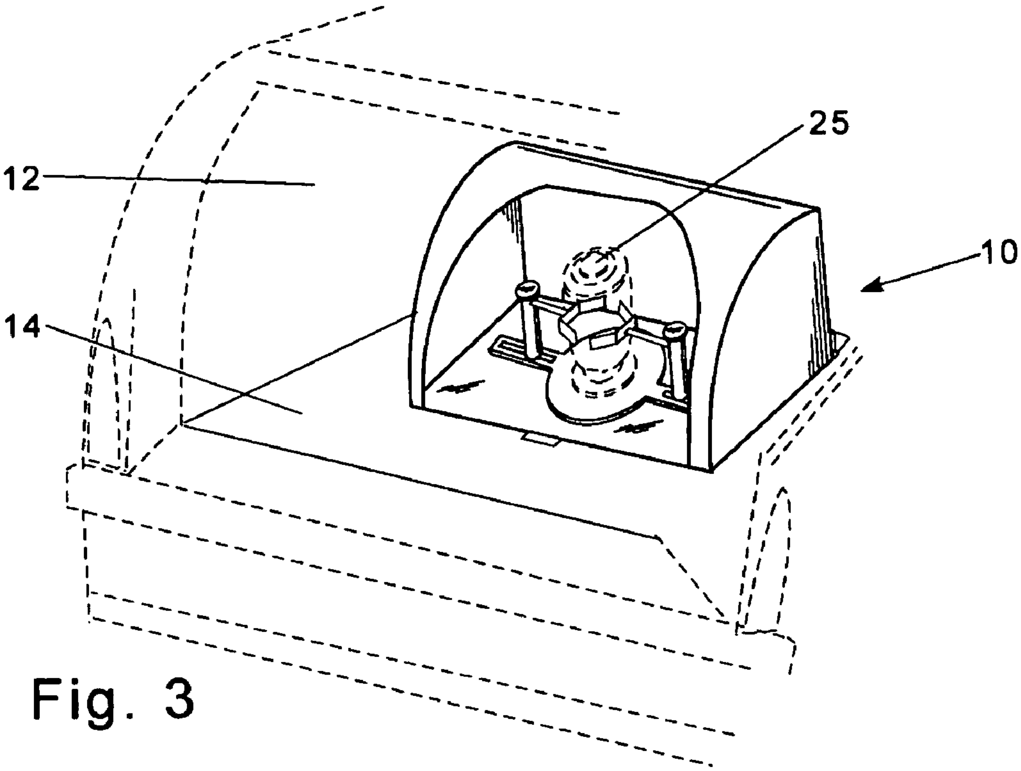
FIG. 3 is the same perspective view as FIG. 2 with the device in the open or display mode on the floor of the rear compartment of the hearse.

FIGS. 2 and 3 are offered to illustrate the storage and display modes of the disclosed apparatus 10. In FIG. 3, the apparatus is in the display mode positioned rearward in the rear compartment of a hearse, which is drawn in phantom. In FIG. 2, the apparatus 10 is in the concealed mode with only the back side 15 of the apparatus apparent as it covers the opening in the floor of the hearse. Also apparent from FIG. 2 is a handle and latch mechanism 24 for grasping the apparatus 10 and releasing a latch to enable the apparatus 10 to assume the display mode. Preferably the apparatus 10 is biased in the display mode by a hydraulic or pneumatic mechanism 4.

Figure 4:
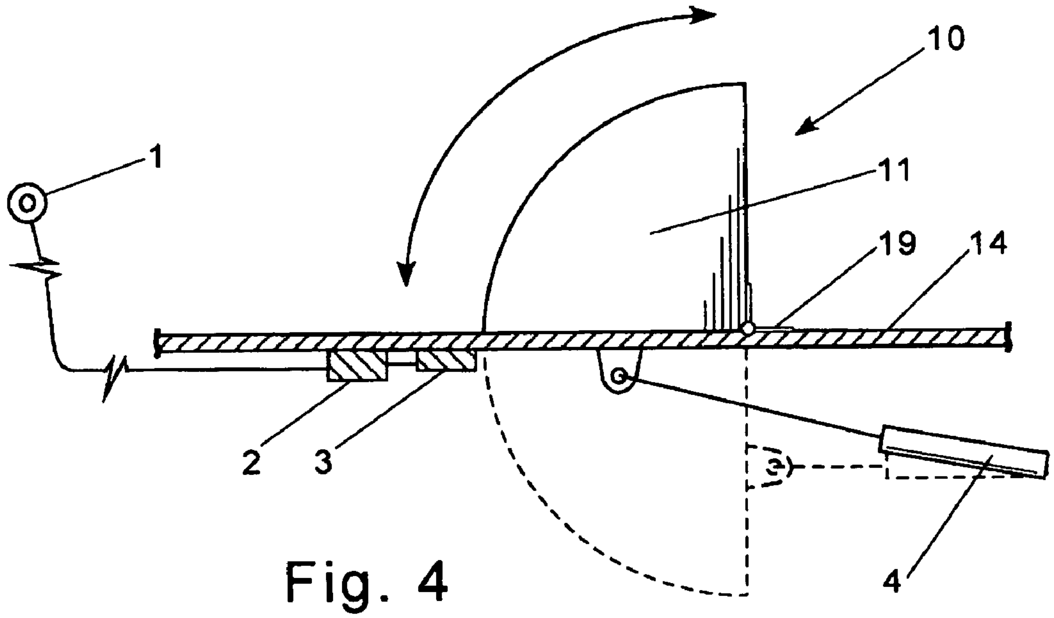
FIG. 4 is a schematic side view of the disclosed device illustrating the elements of an automated system for raising the device from its place of storage.

With regard to FIG. 4, a schematic illustrating the automated raising of the disclosed apparatus, one can readily appreciate how pressing a simple switch 1 activates a solenoid 2, which opens latch 3 enabling a pneumatic cylinder 4 to push the apparatus and allow it to pivot the apparatus 10 into open or display mode.

The housing of the apparatus can be fabricated from a variety of materials including metals, plastics and ceramics. The only requirement is that the materials form a housing that is durable and attractive.

While the foregoing is a detailed and complete description of the preferred embodiments of the disclosed urn carrying apparatus, it should be apparent that numerous variations and modifications can be made and employed to implement the all important purpose of the disclosed apparatus without departing from the spirit of the invention, which is fairly defined by the appended claims.

The invention claimed is:

1. An apparatus for facilitating the transport of a funeral urn in the rear compartment of a hearse, said apparatus pivotable within an opening in the floor of said rear compartment to allow said apparatus to assume display and storage modes, said apparatus comprising:

a housing having a viewing port and at least two sides, one of which pivots to close said opening in the floor of said hearse when the apparatus is in the display mode and another of which pivots to close said opening in the floor of said hearse when the apparatus is in the storage mode;

a pivoting means positioned at the juncture of said pivoting sides permitting said apparatus to rise above the floor of said rear compartment and to descend beneath the floor of said rear compartment; and, a securing means positioned within said housing to securely hold said funeral urn during transport.

2. The apparatus according to claim 1 wherein the securing means is adjustable to accommodate a variety of urns.

3. The apparatus according to claim 1 wherein the pivoting sides are of the same size and shape.

4. The apparatus according to claim 1 wherein the pivoting means is a hinge mechanism.

5. The apparatus according to claim 1 wherein the viewing port is positioned toward the rear of said hearse.

6. The apparatus according to claim 1 wherein the housing is biased in the display mode.

7. The apparatus according to claim 6 further including a latch handle to facilitate allowing said device to assume the display mode.

* * * * *